United States Patent

Bella et al.

[15] 3,652,097

[45] Mar. 28, 1972

[54] PHONOGRAPH CARTRIDGE CONNECTOR

[72] Inventors: David Bella, Northlake; Seymour Kessler, Wilmette, both of Ill.

[73] Assignee: Zenith Radio Corporation, Chicago, Ill.

[22] Filed: June 19, 1969

[21] Appl. No.: 834,707

[52] U.S. Cl. ....................274/37, 274/24 R

[51] Int. Cl. ....................G11b 3/02

[58] Field of Search....................274/37; 179/100.41; 339/64, 339/91

[56] References Cited

UNITED STATES PATENTS 2,432,444 12/1947 Roberts ....................274/37

2,557,752 6/1951 Miner ....................274/37

*Primary Examiner*—Leonard Forman

*Assistant Examiner*—Charles E. Phillips

*Attorney*—John J. Pederson

[57] ABSTRACT

A simple and economical electrical connector plug for a phonograph pickup cartridge adapted to engage a rotating phonograph record and track the record grooves therein for translating the undulations of the grooves into corresponding electrical signals for application by wires to suitable electronic amplifying equipment. The detachable connector plug is provided with an indexing projection and electrical contacts connected to the wires and adapted to mate with the output signal contacts of the active element of the phonograph cartridge for coupling the electrical signals to the amplifying equipment.

2 Claims, 4 Drawing Figures

Inventors
David Bella
Seymour Kessler
By John J. Pedersen
Attorney

PHONOGRAPH CARTRIDGE CONNECTOR

BACKGROUND OF THE INVENTION

A phonograph pickup cartridge adapted to engage a rotating phonograph record and track the record grooves therein for translating the undulations of the grooves into corresponding electrical signals typically utilizes wires to apply the electrical signals to suitable electronic amplifying equipment. A modern stereophonic cartridge, for example, generally employs four wires to transmit electrical signals from each of the two active transducer elements, corresponding to the "right" and "left" stereo channels, to the amplifiers. The wires are connected to the nontracking ends of the transducer elements by various means and are carried inside the associated phonograph tone arm.

Conventional phonograph cartridges are constructed with a minimum amount of physical size and weight in order to maintain a relatively high degree of reproduction fidelity and minimum record wear. The cartridge parts are necessarily rather small with a typical cartridge having dimensions of approximately 1 inch long by three-fourths inch high by one-half inch wide. The wires and connections thereof to the cartridge are generally quite small and delicate. Consequently, cartridge replacement is often a rather tedious procedure resulting in broken wires, damaged cartridges, and even frayed nerves. Obviously, the servicing of such a cartridge, including the replacement thereof, is an operation which requires a relatively high degree of manual dexterity and finesse on the part of the person performing the operation.

In an effort to make cartridge replacement easier to perform and more reliable from the standpoint of insuring a satisfactory electrical contact, some conventional phonograph cartridges have employed connector plugs and jacks to couple the wires to the cartridge. The complexity of such conventional connector arrangements, however, entails a relatively high cost, especially in the field of mass-produced, home-entertainment-type record players.

It is therefore a primary object of the invention to provide a new and improved phonograph cartridge with an easily detachable connector plug which establishes reliable electrical contact.

It is a further object of the invention to provide such a new and improved connector with a minimum number of parts and minimum manufacturing cost.

SUMMARY OF THE INVENTION

A phonograph pickup cartridge constructed in accordance with the invention and adapted to engage a rotating phonograph record and track the record grooves therein for translating the undulations of the grooves into corresponding electrical signals for application by wires to suitable electronic amplifying equipment, comprises a stylus for tracking the grooves and moving therein in accordance with the undulations; an electromechanical transducer enclosed in a cartridge housing and having an active element for converting mechanical motion into a corresponding electrical output signal, with the active element including a pair of contacts for extracting the output signal; and means for coupling the stylus movement to the active element. Also included is a detachable connector plug provided with an indexing projection and having electrical contacts connected to the wires and adapted to mate with the output signal contacts of the active element for coupling the electrical signals to the amplifying equipment. Further included are guide means including an indexing trackway provided in the transducer and adapted to receive the projection in a unique orientation, for receiving and retaining the plug with its contacts in mating engagement with the output signal contacts of the active element.

BRIEF DESCRIPTION OF THE DRAWING

The features of the present invention which are believed to be novel are set forth with particularity in the appended claims. The invention, together with further objects and advantages thereof, may best be understood by reference to the following description taken in conjunction with the accompanying drawing, in the several figures of which like reference numerals identify like elements, and in which:

DESCRIPTION OF THE PREFERRED EMBODIMENT

Figures 1, 2, 3, 4:
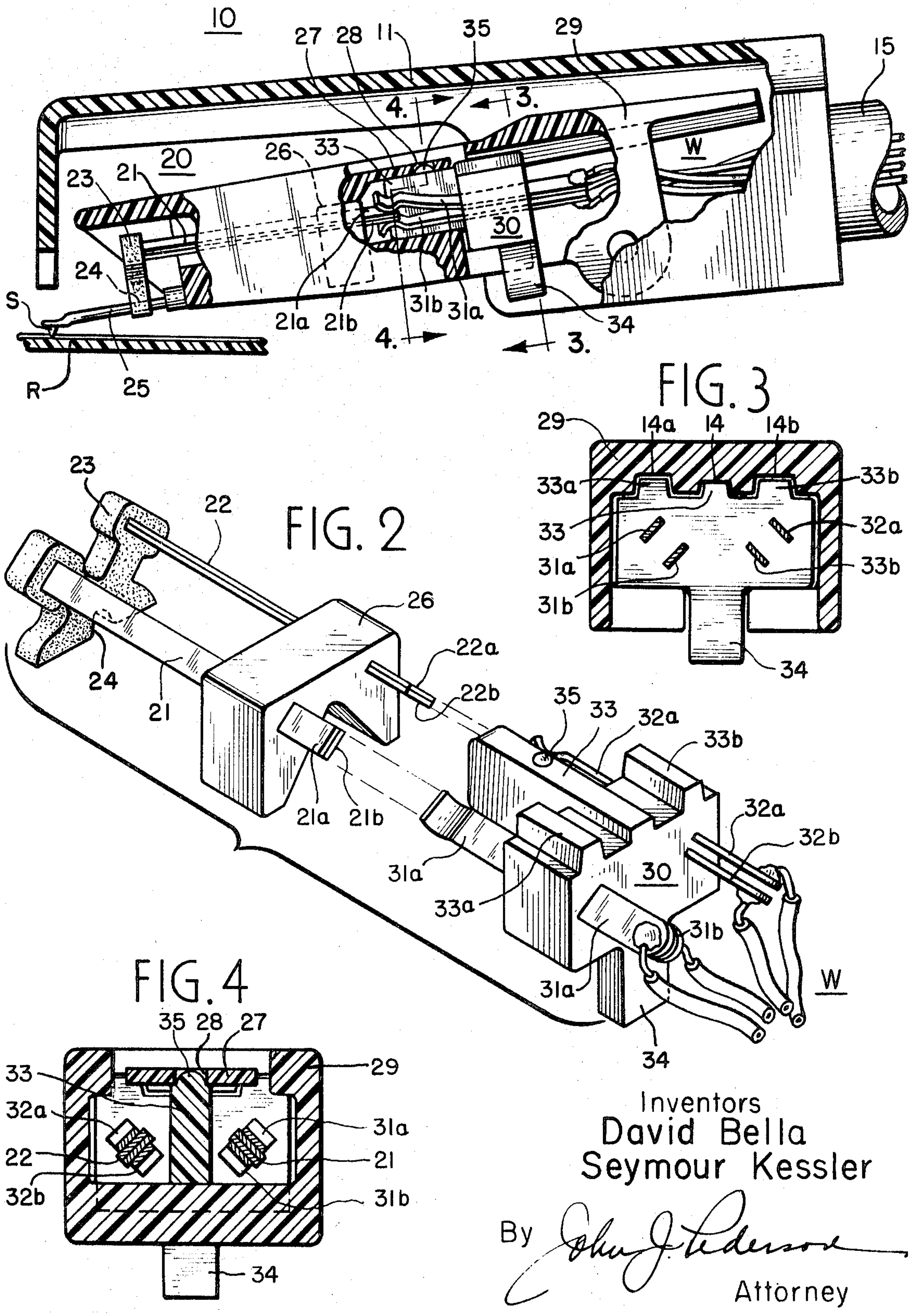
FIG. 1 is a side elevational view, partially in section, of a phonograph pickup cartridge with a detachable self-indexing connector plug embodying the principles of the present invention.
FIG. 2 is a perspective view of the transducer active element structure and the detachable connector plug of the cartridge shown in FIG. 1.
FIG. 3 is a sectional view taken along line 3—3 of FIG. 1.
FIG. 4 is a sectional view taken along line 4—4 of FIG. 1.

With reference to FIG. 1, there is shown a phonograph pickup cartridge 10 attached to the end of a partially shown phonograph tone arm 15. The cartridge is adapted to engage a rotating phonograph record R (partially shown) by means of stylus S and thereby track the record grooves therein for translating the undulations of the grooves into corresponding electrical signals for application by wires W to suitable electronic amplifying equipment (not shown). The cartridge housing 11 encloses an electromechanical transducer 20 having, in this embodiment, two active elements 21 and 22 (22 not shown in FIG. 1, see FIG. 2) for converting mechanical motion into corresponding electrical signals. Each active element preferably consists of an elongated flexible piezoelectric cantilever member of rectangular cross-section. Active elements 21 and 22 are together mounted along parallel-spaced axes with their transverse axes normal to each other and each at an angle of 45° relative to partially shown record R. Thus, the cartridge shown is quite suitable for playback of stereophonic records. It is understood, of course, that the invention is not limited to stereo cartridges and may be utilized with any phonograph cartridge employing wires to couple the cartridge output signal to an amplifier.

Each active element is further provided with a pair of contacts for extracting the cartridge output signal. As shown in FIG. 1, element 21 is provided with contacts **21*a* and 21*b* in the form of an extension of element 21 to the right of a supporting block 26; element 22 is similarly provided with a pair of contacts 22*a* and 22*b* (see FIG. 2). Block 26 securely holds elements 21 and 22 within transducer 20** and may be constructed from an electrically insulating material such as rubber or vinyl plastic.

In accordance with the invention, a detachable connector plug 30 is provided to connect wires W to transducer 20 and thereby couple the electrical signals to the aforementioned electronic amplifying equipment. Plug 30 may be molded from plastic and is provided with an indexing projection 33 and with two pairs of electrical contacts, **31*a* and 31*b*, and 32*a* and 32*b* (32*a* and 32*b* not shown in FIG. 1, see FIG. 2), adapted to mate with the output signal contacts 21*a* and 21*b*, and 22*a* and 22*b*, respectively. Each contact is preferably a one-piece construction extending through plug 30 and having its rear portion extended to the right of plug 30 and soldered to one of wires W. The front portion of each contact is curved in order to resiliently mate with its associated active element and thereby establish a good electrical contact. The rear of transducer 20 is provided with an opening at the bottom and guide means in the form of an indexing slide trackway 14 at the top (not shown in FIG. 1, see FIG. 3) which is adapted to receive projection 33 in a unique orientation, for receiving and retaining plug 30 with its contacts in mating engagement with the output signal contacts of the active elements. Plug 30 is further provided with a small handle 34 for permitting one's finger to simply push the plug 30 along the trackway until contacts 31*a*, 31*b*, 32*a* and 32*b* respectively engage output signal contacts 21*a*, 21*b*, 22*a* and 22*b*. Transducer 20 is further provided with detent means in the form of a flexible cantilever portion 27 (see FIG. 4) having a hole 28 which engages a dimple 35 on projection 33** upon the mating engagement of the contacts to frictionally engage the plug and releasably hold the plug in its operative position. Thus, the entire connection operation consists of merely placing the plug in the trackway of the transducer and simply pushing the plug handle to slide the plug with its projection forward until the contacts are snapped into mating engagement by the detent arrangement. In addition to its simplicity, the structure provides reliable electrical contact with a minimum possibility of cartridge damage.

The perspective view of FIG. 2 depicts in greater detail the transducer active element structure and detachable connector plug of the cartridge shown in FIG. 1. It is understood that the particular transducer structure shown in the drawing forms no part of the invention and is merely representative of one type of transducer which may utilize the principles of the invention. The front ends of active elements 21 and 22 are embedded in a yoke 23 which is made of an electrically insulating compliant material such as rubber or vinyl plastic and floats within transducer 20. It has been found desirable to construct the piezoelectric generating elements from a barium titanate ceramic to form a bimorph generating element. A notch 24 is provided in yoke 23 for engaging stylus support arm 25 to thereby couple the stylus movement to the active elements. The rear end of each generating element is supported in block 26. Supporting block 26 may be glued to a correspondingly-shaped recess in transducer 20 to rigidly hold elements 21 and 22 and thereby provide the foundation for a cantilever movement. Moreover, by extending elements 21 and 22 to the right beyond supporting block 26, the element surface area thus provided may be used to form a pair of contacts, **21*a* and 21*b*, and 22*a* and 22*b***, for extracting the output signal.

As discussed above, plug 30 may preferably be molded from a rigid plastic material with contacts **31*a*, 31*b*, 32*a* and 32*b* each consisting of a continuous conductive strip extending through plug 30. Thus, when the plug is pushed into its operative position, the plug contacts directly mate with the rear end of the transducer elements thereby eliminating intermediate connections and supporting structure conventionally required therefor. It is quite apparent, therefore, that this structure utilizes a minimum number of parts and is easily mass-produced for economical consumer products application. Moreover, for increased tracking stability and ease of plug-transducer connection/disconnection, indexing projection 33 may be augmented by a pair of auxiliary indexing projections 33*a* and 33*b* as shown which engage corresponding auxiliary indexing trackways 14*a* and 14*b* in rear portion 29 of transducer 20**.

The cross-sectional view of FIG. 3 more clearly illustrates the guide means in the form of a three-channel indexing trackway (14, **14*a* and 14*b*) provided in rear portion 29 of transducer 20 and the respective engagement therewith by indexing projections 33, 33*a* and 33*b***.

The cross-sectional view of FIG. 4 more clearly illustrates the detent means of the illustrated embodiment of the invention. Flexible cantilever member 27 may be constructed of suitable plastic and be integrally molded with transducer 20.

Thus, there has been shown a new and improved phonograph cartridge having a detachable connector plug which enables a reliable connection and disconnection thereof in a simple manner. With such a plug, cartridge replacement may be performed quickly and efficiently with virtually no possibility of damage to the cartridge structure. Moreover, the entire plug assembly may be molded out of a material such as plastic and have the contacts embedded therein to provide an extremely durable and relatively economical construction.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a phonograph pickup cartridge adapted to engage a rotating phonograph record and track the record grooves therein for translating the undulations of said grooves into corresponding electrical signals for application by wires to suitable electronic amplifying equipment, said cartridge including a stylus for tracking said grooves and moving therein in accordance with said undulations; an electromechanical transducer enclosed in a cartridge housing and having an active element for converting mechanical motion into a corresponding electrical output signal, said active element including a pair of contacts for extracting said output signal; and means for coupling said stylus movement to said active element; the improvement comprising:

a detachable connector plug provided with a slideable indexing projection and having electrical contacts connected to said wires and adapted to mate with said output signal contacts of said active element for coupling said electrical signals to said amplifying equipment; and guide means including an indexing slide trackway provided in said transducer and adapted to receive said projection in a unique orientation, for receiving and retaining said plug with its contacts in mating engagement with said output signal contacts of said active element.

2. A phonograph cartridge according to claim 1, in which said transducer further comprises detent means for frictionally engaging said plug and releasably holding said plug in said operative position.

* * * * *